United States Patent [19]

Kinugawa

[11] 3,943,891
[45] Mar. 16, 1976

[54] AIR-FLOW METERING DEVICE FOR FUEL INJECTION SYSTEM OF INTERNAL COMBUSTION ENGINE

[75] Inventor: Masumi Kinugawa, Kariya, Japan

[73] Assignee: Nippondenso Co., Ltd., Kariya, Japan

[22] Filed: June 27, 1974

[21] Appl. No.: 483,909

[30] Foreign Application Priority Data
Aug. 9, 1973  Japan............................. 48-89857

[52] U.S. Cl. ........... 123/32 EA; 73/228; 123/119 R
[51] Int. Cl.² ......................................... G01F 1/28
[58] Field of Search ....... 123/32 EA, 119 R; 73/228

[56] References Cited
UNITED STATES PATENTS

| | | | |
|---|---|---|---|
| 2,975,635 | 3/1961 | Kindler et al. | 73/228 |
| 3,034,337 | 5/1962 | Parmater | 73/228 |
| 3,092,994 | 6/1963 | Moller | 73/228 |
| 3,720,192 | 3/1973 | Aono | 123/32 EA |
| 3,750,631 | 8/1973 | Scholl et al. | 123/32 EA |
| 3,765,387 | 10/1973 | Knapp | 123/32 EA |
| 3,837,321 | 9/1974 | Sauer | 123/32 EA |

Primary Examiner—Charles J. Myhre
Assistant Examiner—Paul Devinsky
Attorney, Agent, or Firm—Cushman, Darby & Cushman

[57] ABSTRACT

An air-flow metering device for a fuel injection system of an internal combustion engine comprises a blade means installed in an intake pipe of the engine and turned by the air flowing therethrough, a blade turn detecting means and an air passing means for changing the air passing area thereof in combination with the blade means in accordance with the turning of the blade means, thereby to supply optimum air flow into the engine.

2 Claims, 6 Drawing Figures 3,943,891

AIR-FLOW METERING DEVICE FOR FUEL INJECTION SYSTEM OF INTERNAL COMBUSTION ENGINE

BACKGROUND OF THE INVENTION

This invention relates to an air-flow metering device for a fuel injection system of an internal combustion engine, which meters the amount of the air flowing into the engine to precisely determine the corresponding amount of the fuel, thereby to supply optimum air-fuel mixture into the engine.

In a conventional air-flow metering device, a flap or a wind wheel is installed in the intake pipe, in which the inclination of the flap or the revolution of the wheel is taken as the representation of the air flowing into the engine, thereby to determine the amount of the fuel to be injected. However these conventional devices have some drawbacks, which are explained as follows. In case of installing the flap, as the flap is responsive to the vacuum pressure difference produced between the upstream and the down stream of the flap, when the throttle valve is opened widely, it is affected by the fluctuation of suction pressure of the engine. Further a check valve is required to protect the flap from engine back fire. Furthermore since the inclination is not proportioned to the amount of the air flow, a potentiometer is requried to provide complex characteristics to get a precisely correct signal with resultant high cost. On the other hand, in the case of an installed the wind wheel, it may be rotated excessively by its own inertia thereby to result in bad response, when the air velocity goes down rapidly. Further, as it produces an AC signal, it necessitates a D-A converter to get an analog signal representing the air flow, resulting in high cost.

SUMMARY OF THE INVENTION

With a view to overcoming the problems described above, it is a primary object of the present invention to provide an improved air-flow metering device which can easily obtain an electric signal representing the precise amount of the air flow with high response characteristic but without high cost, a potentiometer of complex construction and a check valve for preventing back fire. Another object of the present invention is to provide an air-flow metering device which comprises a blade means, a blade turn detecting means connected with the blade means, and an air passing means for changing the air passing area in accordance with the turning of the blade means.

The above and other objects, features and advantages of the present invention will be apparent from the following detailed description of a preferred embodiment thereof taken in conjunction with the accompanying drawing.

DESCRIPTION OF THE PREFERRED EMBODIMENT

Figure 1:
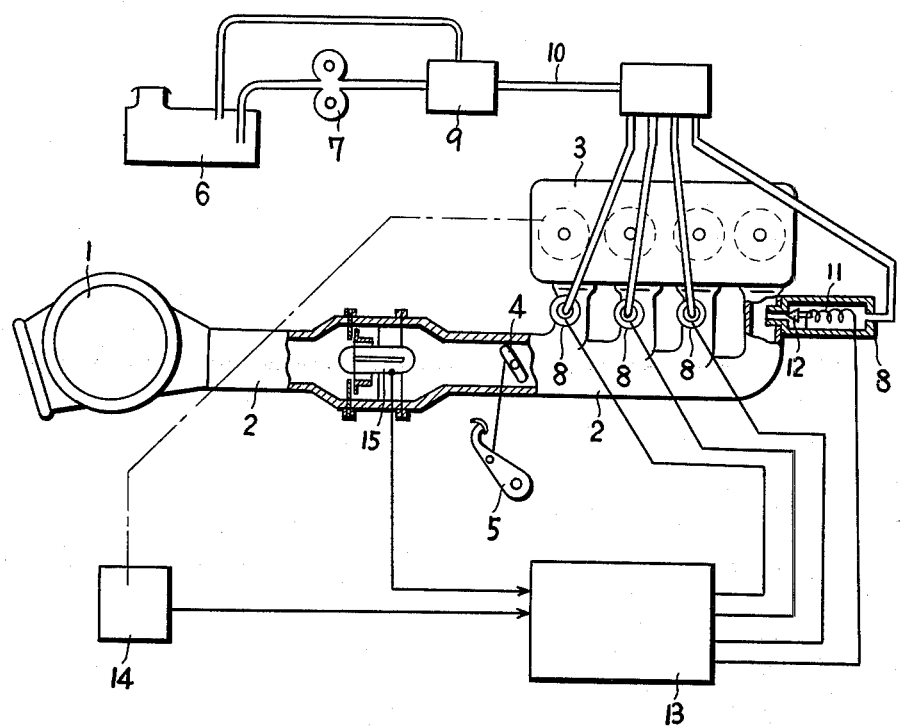
FIG. 1 shows a schematic illustration of an internal combustion engine which includes an air-flow metering device for a fuel injection system according to the present invention.
Figure 2:
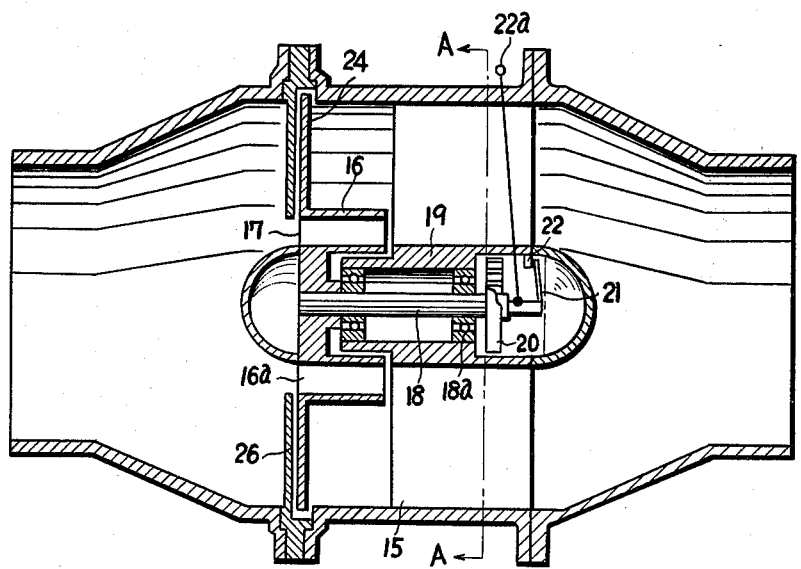
FIG. 2 shows an enlarged cross-sectional view of the air-flow metering device of the present invention.
Figure 3:
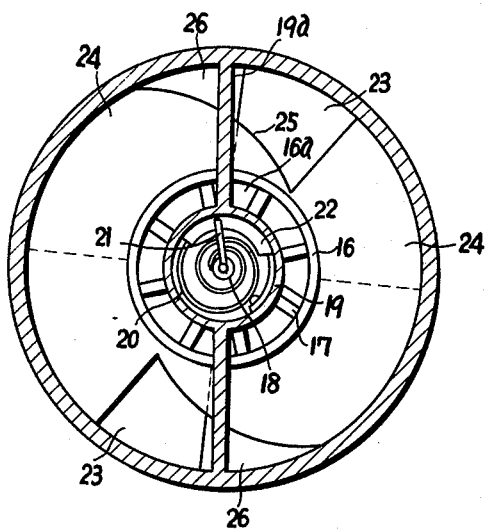
FIG. 3 shows a cross-sectional view taken along the line A—A of FIG. 2.
Figure 4:
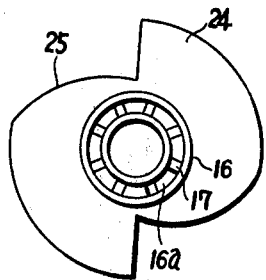
FIG. 4 shows a front view of a blade means shown in FIG. 2.
Figure 5:
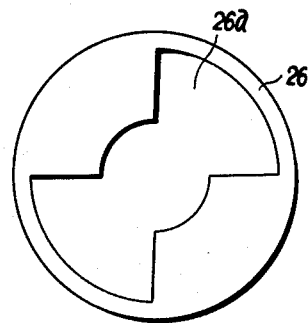
FIG. 5 shows a front view of a disk shown in FIG. 2.

Referring to FIG. 1, numeral 1 designates an air cleaner, 2 an intake pipe, 3 an engine, 4 a throttle valve mounted in the intake pipe to co-operate with an accelerator 5, 6 a fuel tunk, 7 a fuel pump. Numerals 8 designate fuel injectors injecting the fuel coming through a pressure regulator 9 and a fuel pipe 10 by the fuel pump 7 into the engine 3. The fuel injectors 8 inject to supply the fuel in response to the operation of the needle valves 12 which are actuated by the solenoids 11. Numeral 13 designates a control unit which produces the fuel injection signal applied to the solenoids 11 of the injectors 8 in accordance with the signals from a crank shaft turning angle detector 14 and an air-flow metering device 15 thereby to supply optimum fuel into the engine 3.

Next, the air-flow metering device 15 will be explained referring to FIGS. 2 to 5. Numeral 19 designates a retaining member fixedly installed in the intake pipe 2 with ribs 19a to support a shaft 18 therein rotatably through bearings 18a. Numeral 20 designates a balance spring having one end fixed to an end of the shaft 18 and the other fixed to the retaining member 19. Numeral 21 designates a sliding arm fixed on the same end of the shaft 18 as said balance spring. Numeral 22 designates an arcuate variable resistor fixed on the retaining member 19. The sliding arm 21 slides on the variable resistor 22 with turning of the shaft 18. Numeral 16 designates a blade means fixed on the other end of the shaft 18, which has a plurality of radial blades 17 which extend outwardly and are arranged to dispose at a suitable angle of attack with regard to the stream line of the air and a metering plate 24 having cut-off portions 25 to control the air flow. This blade means 16 is turned around the shaft 18 by the lifting force produced by the air flow. Numeral 26 designates a disk secured in the intake pipe 2 adjacent the metering plate 24. The disk 26 has an aperture 26a which forms air passages 23 in combination with the cut-off portions 25 to pass the air therethrough into the engine.

The operation of above described embodiment is as follows. When the engine 3 is started, the air is sucked through the intake pipe 2 into the engine 3, which partially passes the intervening open area 16a between the neighboring blades 17 to produce the lifting force at the blades 17. As the result, the blade means 16 is turned some degree around the shaft 18 until the lifting force balances the biasing force of the balance spring 20 to make the sliding arm 21 slide on the variable resistor 22. Thus, the optimum amount of the air flows into the engine 3 through the air passages 23 and also the electric signal representing the precise amount of the air can be obtained.

In the above construction, if the lifting force of the blades 17 is represented by "L," the velocity of the air is represented by "V" and the density of the air is represented by "$\rho$," the relationship thereof can be expressed as;

$$L \alpha \rho V^2 \dots\dots \quad (1)$$

On the other hand, if the spring constant of the balance spring 20 and the angular displacement of the blade means 16 or shaft 18 are respectively represented by K and $\phi$, the following formula can be obtained.

$$L \alpha K \phi \qquad (2)$$

Furthermore, if the weight flow rate of the air is expressed as G and the area of the air passages 23 is represented by "A" when the angular displacement of the blade means 16 is $\phi$, the following formula can be obtained.

$$\rho V^2 = \frac{1}{\rho} \frac{G^2}{A^2} \qquad (3)$$

From the above (1), (2) and (3) formulas, the next can be obtained.

$$K \phi \alpha \frac{1}{\rho} \frac{G^2}{A^2} \qquad (4)$$

Therefore, if the relationship between the area "A" of the air passages 23 and the angular displacement "$\phi$" of the blade means 16 is made to be formulated as A $\alpha \sqrt{\phi}$ the formula (4) can be expressed by the following;

$$\phi \alpha \frac{KG}{\sqrt{\rho}} \qquad (5)$$

From the above, it has become clear that the angular displacement $\phi$ of the blade means 16 is proportioned to the air flow, that is weight flow rate G, so that the variable resistor 22 changes its resistance in proportion to the change of the weight flow rate G. Thus, the voltage signal representing the weight flow rate G is applied to the control unit 13 from the variable resistor 22 to supply the optimum fuel corresponding to the air flow into the engine 3 through the fuel injectors 8.

Figure 6:
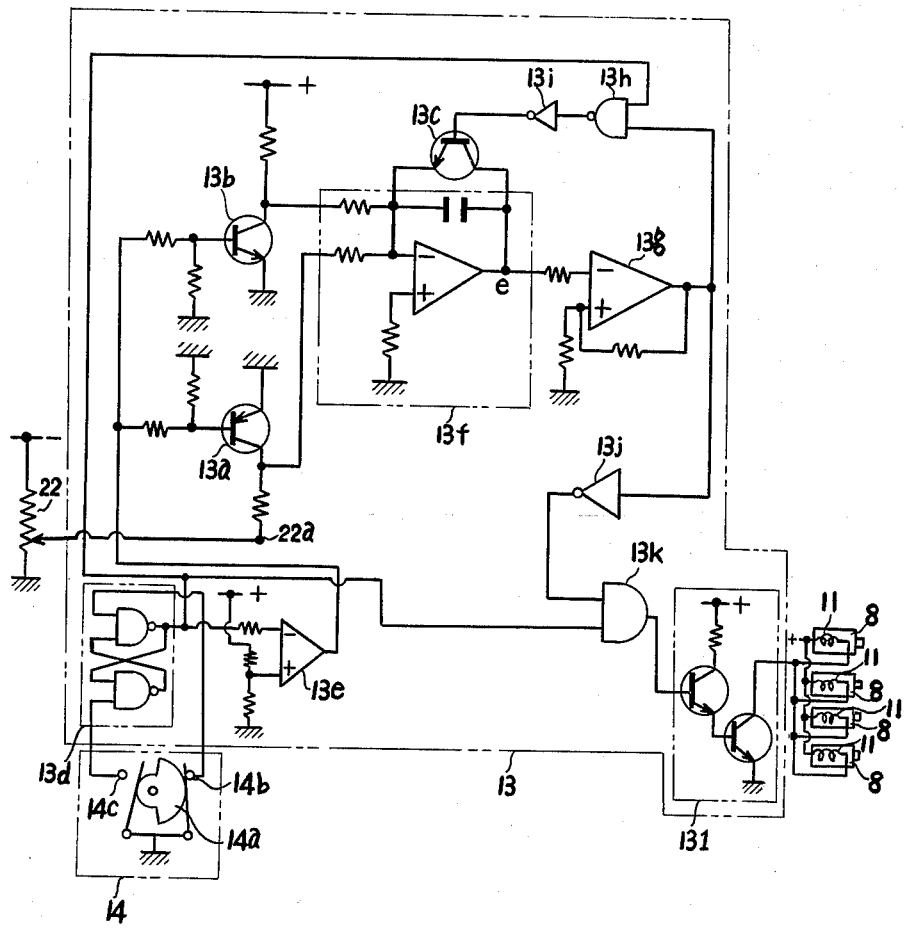
FIG. 6 shows a circuit diagram of a control unit shown in FIG. 1.

Referring to FIG. 6 showing the electric circuit of the control unit 13, the foregoing variable resistor 22 is connected with minus terminal of the battery at one end, grounded at the other end and connected with the terminal 22a at the end of its sliding arm 21. The control unit 13 comprises transistors 13a, 13b and 13c, an R-S flip-flop 13d, a level changing comparator 13e, an integrator 13f, a comparator 13g, a NAND gate 13h, inverters 13i and 13j, an AND gate 13k and an amplifier 131. The crank shaft turning angle detector 14 which comprises a cam 14a and contact points 14b and 14c sets or resets the R-S flip-flop 13d. The amplifier 131 which comprises two transistors connected in darlington circuit amplifies the injection pulse emitted from the AND gate 13k to energize the solenoids 11 of the fuel injectors 8 to inject the fuel. The integrator 13f integrates the output voltage signal of the air-flow metering device 15 during the time corresponding to the angular displacement of the crank shaft from 0° to 180° thereby producing the output voltage proportional to the amount of the air flow of one engine cycle. The integrated voltage is then discharged at a constant discharging rate during the time corresponding to the angular displacement of the crank shaft from 180° to 360°, in which the time period from the beginning of the discharge to the end is proportioned to the integrated voltage and is utilized as the injection period. As the 4-cycle engine completes its full cycle during the period corresponding to the crank angle displacement from 0° to 720°, the second injection pulse is produced in the control unit 13 in this embodiment in the period corresponding to the crank angle displacement from 360° to 720°.

Further, it is possible to use a photo electric device instead of the variable resistor 22 and sliding arm 21 such a device comprising a lamp, a photo-semiconductor and an interrupting plate interposed therebetween to interrupt the light reaching the photo-semiconductor according to the turn of the blade means 16. Furthermore a variable condenser and variable coil are also available as the turn detecting means in combination with an alternating current generator. In the above embodiment, when the back fire takes place, the combustion gas flows out of the air passages 23 without harming the intake apparatus, such as an air cleaner or a throttle valve. Thus no check valve for the back fire is necessary.

What we claim is:

1. An air-flow metering device for a fuel injection system of an internal combustion engine comprising;
    a retaining member fixed in an intake pipe of the engine so as not to interrupt air flowing therethrough into the engine,
    a shaft rotatably supported by said retaining member,
    a plurality of radial blades fixed to said shaft in said intake pipe, said blades having an angle of attack against a stream line of air flowing through said pipe so as to be turned by the lifting force produced by said air impinging on the blades,
    a metering plate fixed to said blades to extend outwardly therefrom, said plate having at least one cut-off portion and being adapted to turn as said blades turn;
    a disk fixed in said intake pipe adjacent said metering plate, said disk having at least one aperture therein in cooperative relationship with said cut-off portion for forming at least one air passage to said engine, said cut-off portion changing the cross sectional area of said air passage as the metering plate turns, and
    an electric turn detecting means connected with said shaft for converting the turn of said shaft into an electric signal.
2. An air-flow metering device for a fuel injection system as claimed in claim 1, wherein,
    said electric turn detecting means comprises a variable resistor secured to said intake pipe and a sliding arm secured to said shaft to slide on said variable resistor as said shaft rotates thereby changing the resistance of said variable resistor.

* * * * *